United States Patent
Coldren

(10) Patent No.: US 9,068,539 B2
(45) Date of Patent: Jun. 30, 2015

(54) DUAL CHECK FUEL INJECTOR AND FUEL SYSTEM USING SAME

(75) Inventor: Dana R. Coldren, Secor, IL (US)

(73) Assignee: Caterpillar Inc., Peoria, IL (US)

( * ) Notice: Subject to any disclaimer, the term of this patent is extended or adjusted under 35 U.S.C. 154(b) by 299 days.

(21) Appl. No.: 13/566,321

(22) Filed: Aug. 3, 2012

(65) Prior Publication Data

US 2014/0034023 A1 Feb. 6, 2014

(51) Int. Cl.
| | |
|---|---|
| F02M 51/00 | (2006.01) |
| F02M 39/00 | (2006.01) |
| F02M 21/02 | (2006.01) |
| F02M 43/04 | (2006.01) |
| F02M 47/04 | (2006.01) |
| F02M 45/08 | (2006.01) |
| F02M 61/18 | (2006.01) |
| F02D 19/06 | (2006.01) |
| F02M 47/02 | (2006.01) |
| F02M 55/02 | (2006.01) |
| F02M 61/16 | (2006.01) |

(52) U.S. Cl.
CPC ............. *F02M 43/04* (2013.01); *F02M 47/043* (2013.01); *F02M 21/0257* (2013.01); *F02M 45/086* (2013.01); *F02M 21/0248* (2013.01); *F02M 2200/46* (2013.01); *F02M 61/1846* (2013.01); *F02M 61/182* (2013.01); *F02M 61/1826* (2013.01); *F02D 19/0694* (2013.01); *F02M 47/027* (2013.01); *F02M 55/02* (2013.01); *F02M 61/165* (2013.01); *Y02T 10/36* (2013.01); *Y02T 10/32* (2013.01)

(58) Field of Classification Search
CPC ..... F02M 51/00; F02M 51/061; F02M 63/00; F02M 21/0215; F02M 2547/006; F02M 61/205; F02M 21/0257; F02M 21/026; F02M 43/04; F02M 45/086; F02M 47/073
USPC .......................... 123/472, 467, 470, 525, 575; 239/533.2, 533.3, 533.4, 5, 96, 88
See application file for complete search history.

(56) References Cited

U.S. PATENT DOCUMENTS

| | | | | |
|---|---|---|---|---|
| 4,301,825 | A | * | 11/1981 | Simko ............................ 137/111 |
| 4,465,237 | A | | 8/1984 | Kupper |
| 4,957,085 | A | * | 9/1990 | Sverdlin ......................... 123/467 |
| 5,458,292 | A | | 10/1995 | Hapeman |
| 5,526,791 | A | * | 6/1996 | Timmer et al. ................ 123/467 |
| 5,899,389 | A | * | 5/1999 | Pataki et al. ................. 239/533.2 |
| 6,142,107 | A | * | 11/2000 | Stutzenberger ........... 123/27 GE |

(Continued)

FOREIGN PATENT DOCUMENTS

| | | |
|---|---|---|
| JP | 233463 | 2/1990 |
| JP | 7243355 | 9/1995 |

(Continued)

*Primary Examiner* — Lindsay Low
*Assistant Examiner* — George Jin

(57) ABSTRACT

A fuel injector includes a first check valve member that seats on an injector body, and a second check valve member that seats on the first check valve member covers a first nozzle outlet set when in a closed position. When the first check valve member moves to an open position, gaseous fuel is injected through both a first nozzle outlet set and a second nozzle outlet set. When the second check valve member moves to an open position, liquid fuel moves through a through passage defined by the first check valve member to facilitate injection of the second nozzle outlet set. The first and second check valve members may be controlled by first and second control valves, respectively.

20 Claims, 5 Drawing Sheets

(56) References Cited

U.S. PATENT DOCUMENTS

| | | | |
|---|---|---|---|
| 6,298,829 B1* | 10/2001 | Welch et al. | 123/467 |
| 6,298,833 B1* | 10/2001 | Douville et al. | 123/527 |
| 6,439,192 B1* | 8/2002 | Ouellette et al. | 123/299 |
| 6,557,779 B2 | 5/2003 | Perr et al. | |
| 6,601,566 B2* | 8/2003 | Gillis et al. | 123/468 |
| 6,769,635 B2 | 8/2004 | Stewart et al. | |
| 6,918,377 B2* | 7/2005 | Boltz | 123/467 |
| 6,976,760 B2 | 12/2005 | Ito et al. | |
| 7,090,145 B2 | 8/2006 | Baker et al. | |
| 7,124,959 B2 | 10/2006 | Baker et al. | |
| 7,134,615 B2 | 11/2006 | Lawrence | |
| 8,733,326 B2* | 5/2014 | Kim et al. | 123/525 |
| 2002/0070295 A1* | 6/2002 | Baker et al. | 239/533.3 |
| 2004/0256495 A1* | 12/2004 | Baker et al. | 239/533.2 |
| 2005/0173563 A1* | 8/2005 | Coldren et al. | 239/533.1 |
| 2005/0224606 A1* | 10/2005 | Dingle | 239/533.2 |
| 2006/0288978 A1* | 12/2006 | Kesse | 123/295 |
| 2007/0199539 A1* | 8/2007 | Lennox et al. | 123/304 |
| 2010/0199948 A1* | 8/2010 | Rogak et al. | 123/304 |
| 2012/0204835 A1* | 8/2012 | Kim et al. | 123/456 |
| 2013/0199501 A1* | 8/2013 | Hou | 123/472 |
| 2013/0319373 A1* | 12/2013 | Brown et al. | 123/456 |
| 2014/0034023 A1* | 2/2014 | Coldren | 123/472 |
| 2014/0061326 A1* | 3/2014 | Coldren | 239/5 |

FOREIGN PATENT DOCUMENTS

| | | |
|---|---|---|
| JP | 8-74698 | 3/1996 |
| JP | 2001-159382 | 6/2001 |

\* cited by examiner

DUAL CHECK FUEL INJECTOR AND FUEL SYSTEM USING SAME

TECHNICAL FIELD

The present disclosure relates generally to fuel systems for internal combustion engines, and more particularly to a dual check fuel injector.

BACKGROUND

There has been a continuing trend in the industry to expand the capabilities of fuel injectors to allow for more versatility with respect to at least one of spray angles, nozzle flow areas, injections at different fuel pressures, injections of two types of fuels and other variations known in the art. For instance, co-owned U.S. Pat. No. 6,769,635 shows a mixed mode fuel injector with the ability to inject one fuel in two different spray patterns. U.S. Pat. No. 6,557,779 shows a fuel injector with dual actuators and the ability to inject at two different flow rates. Co-owned United States Patent Application Publication No. 2012/0055448 shows a dual fuel common rail system in which individual fuel injectors have the ability to inject both gaseous fuel and liquid fuel, at different pressures. Although there are numerous references that teach various structures for dual check fuel injectors for a variety of reasons, actually mass producing dual check fuel injectors that can successfully perform in the hostile environment of today's engines has proven elusive. For instance, additional sealing problems are often encountered with regard to dual check fuel injectors that can lead to coking problems.

The present disclosure is directed toward one or more of the problems set forth above.

SUMMARY

In one aspect, a fuel injector includes an injector body that defines a first fuel inlet, a second fuel inlet, a first nozzle outlet set, a second nozzle outlet set and a drain outlet. The injector body has disposed therein a first control chamber and a second control chamber. A first check valve member defines a through passage and is positioned entirely inside the injector body with a closing hydraulic surface exposed to fluid pressure in the first control chamber. The first check valve member is movable between a closed position in contact with a first seat on the injector body covering to the first nozzle outlet set to fluidly block the first fuel inlet to the first nozzle outlet set, and an open position out of contact with the first seat to fluidly connect the first fuel inlet to the first nozzle outlet set. A second check valve member is positioned entirely inside the injector body with a closing hydraulic surface exposed to fluid pressure in the second control chamber. The second check valve member is movable between a closed position in contact with a second seat on the first check valve member to fluidly block the second fuel inlet to the through passage and the second nozzle outlet set, and an open position out of contact with the second seat to fluidly connect the second fuel inlet to the through passage and the second nozzle outlet set. A first control valve is attached to the injector body and has a first configuration at which the first control chamber is fluidly blocked to the drain outlet, and a second configuration at which the first control chamber is fluidly connected to the drain outlet. A second control valve is attached to the injector body and has a first configuration at which the second control chamber is fluidly blocked to the drain outlet, and a second configuration at which the second control chamber is fluidly connected to the drain outlet.

In another aspect, a fuel system includes a plurality of the fuel injectors previously described. A source of first fuel is fluidly connected to the first fuel inlet, and a source of second fuel is fluidly connected to the second fuel inlet. An electronic controller is in control communication with each of the plurality of fuel injectors. The first fuel differs from the second fuel in at least one of chemical identity, matter phase and pressure.

In still another aspect, a method of operating a fuel system includes supplying gaseous fuel from a first common rail to the first fuel inlet of each fuel injector. A liquid fuel is supplied from a second common rail to the second fuel inlet of each fuel injector. Gaseous fuel is injected from one of a plurality of fuel injectors through a first nozzle outlet set and a second nozzle outlet set. Liquid fuel is injected from the fuel injector from the second nozzle outlet set.

DETAILED DESCRIPTION

Figure 1:
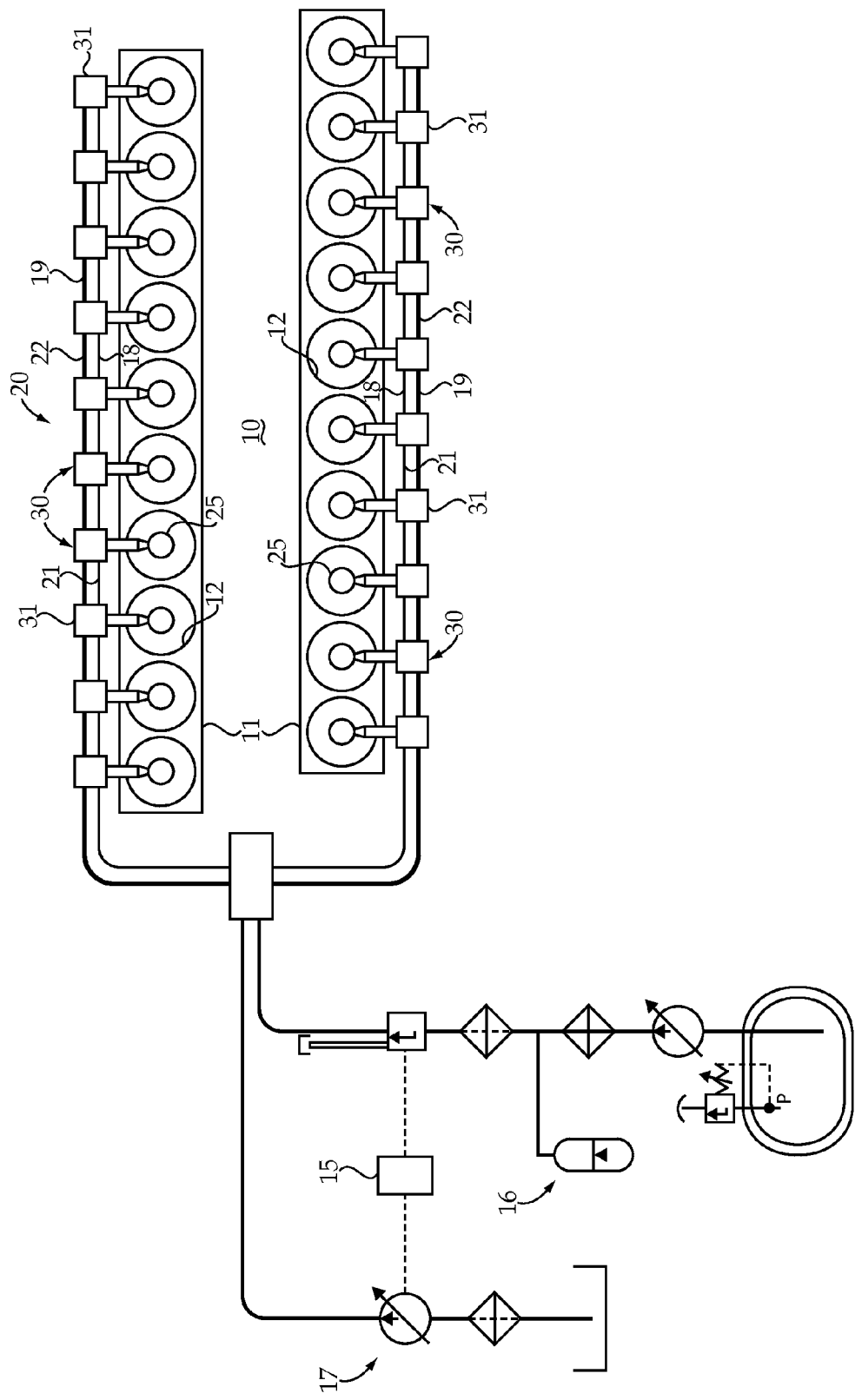
FIG. 1 is a schematic view of a dual fuel engine according to the present disclosure.
Figure 2:
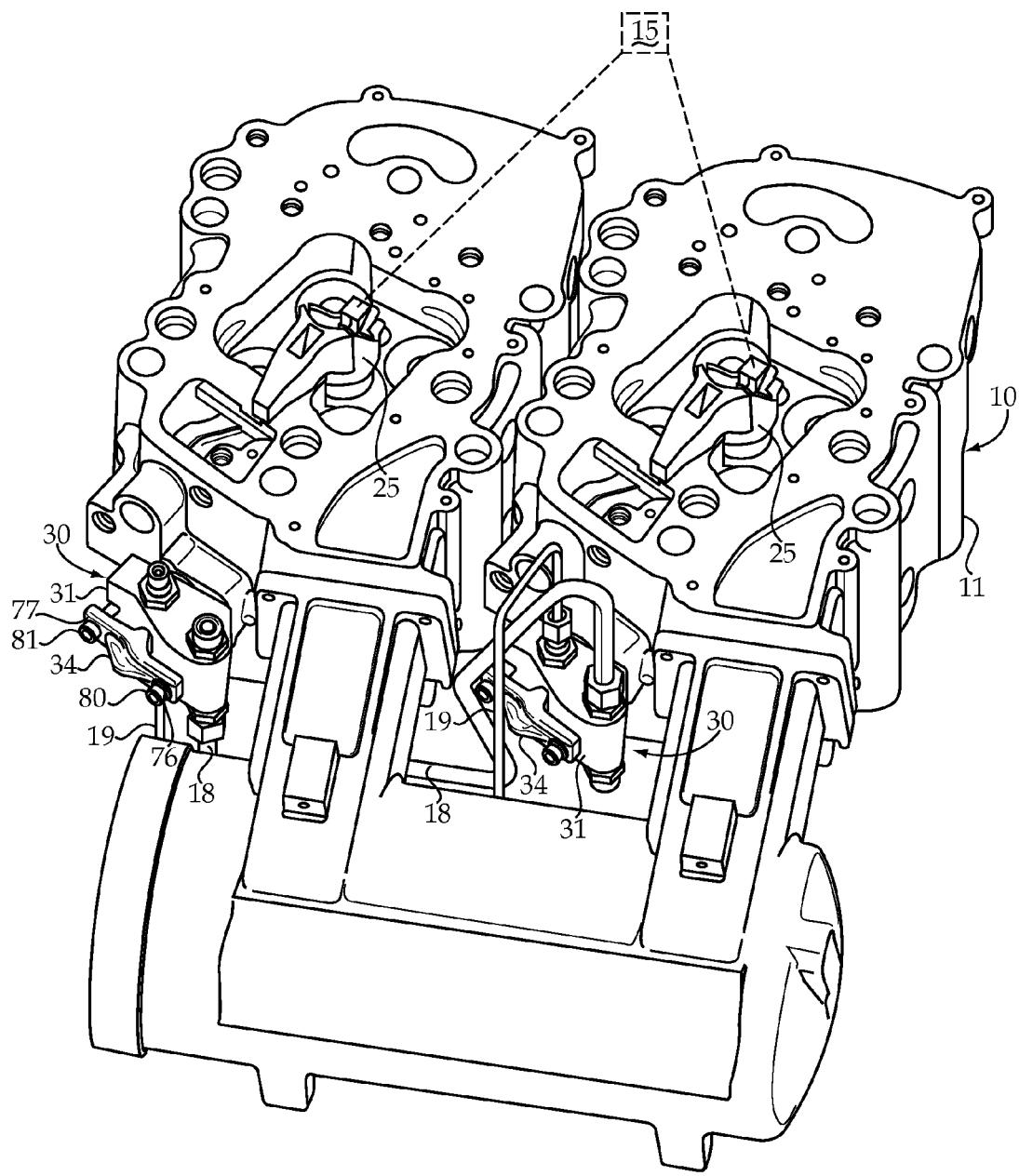
FIG. 2 is a perspective view of a portion of the engine and dual fuel common rail system for the engine of FIG. 1.
Figure 3:
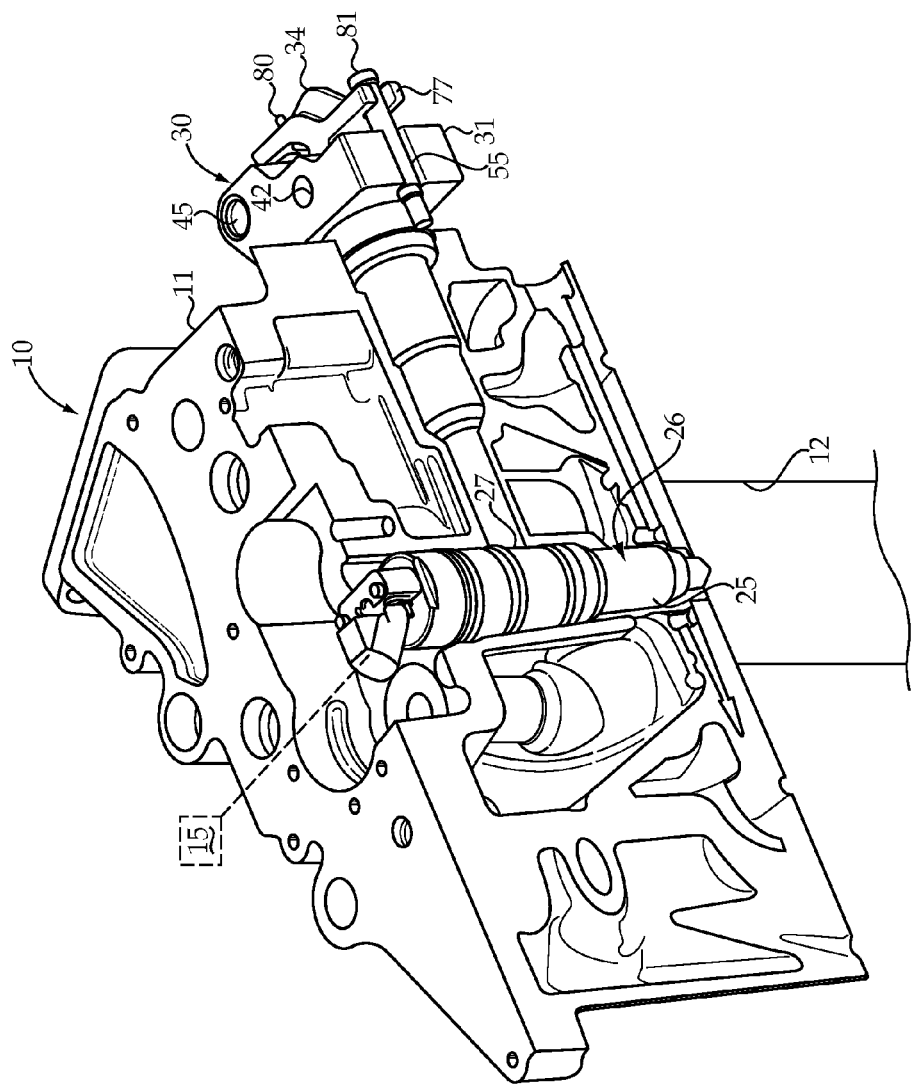
FIG. 3 is a sectioned perspective view of a portion of the engine housing shown in FIG. 2 to reveal structure for one fuel injector and engine cylinder.

Referring initially to FIGS. 1-3, a dual fuel engine 10 includes a dual fuel common rail system 20 mounted to an engine housing 11 that defines a plurality of engine cylinders 12. The dual fuel common rail system 20 includes exactly one fuel injector 25 positioned for direct injection into each of the plurality of engine cylinders 12. A gaseous fuel common rail 21 and a liquid fuel common rail 22 are fluidly connected to each fuel injector 25. The dual fuel common rail system 20 also includes gas supply and pressure control devices 16 as well as liquid supply and pressure control devices 17. Each of the fuel injectors 25, the gas pressure supply and control devices 16 and the liquid supply and pressure control devices 17 are in control communication with, and controlled by, an electronic engine controller 15 in a known manner. The gas supply and pressure control devices 16, which may also be considered as a source of gaseous fuel, may include a pressurized cryogenic liquid natural gas tank with an outlet fluidly connected to a variable delivery cryogenic pump. Devices 16 may also include a heat exchanger, an accumulator, a gas filter and a vented fuel conditioning module that controls the supply and pressure of gaseous fuel to gaseous fuel common rail 21. The liquid supply and pressure control devices 17, which may also be considered as a source of liquid fuel, may include a diesel fuel tank, fuel filters and an electronically controlled high pressure fuel pump that supply liquid fuel to, and control pressure in, liquid fuel common rail 22. In one aspect, it may be desirable to maintain the liquid fuel common rail 22 at a pressure that is greater than the pressure in the gaseous fuel common rail 21. Such a strategy might inhibit migration of gaseous fuel into the liquid fuel throughout fuel system 20, especially within fuel injectors 25.

As best shown in FIGS. 1 and 2, the blocks 31 of the co-axial quill assemblies 30 may be daisy-chained together with gaseous fuel line segments 18 and liquid fuel line segments 19 to define the gaseous fuel common rail 21 and the liquid fuel common rail 22, respectively. The last co-axial quill assembly 30 in the daisy-chain may have a set of plugs in place of the fittings shown in FIG. 2.

Figure 4:
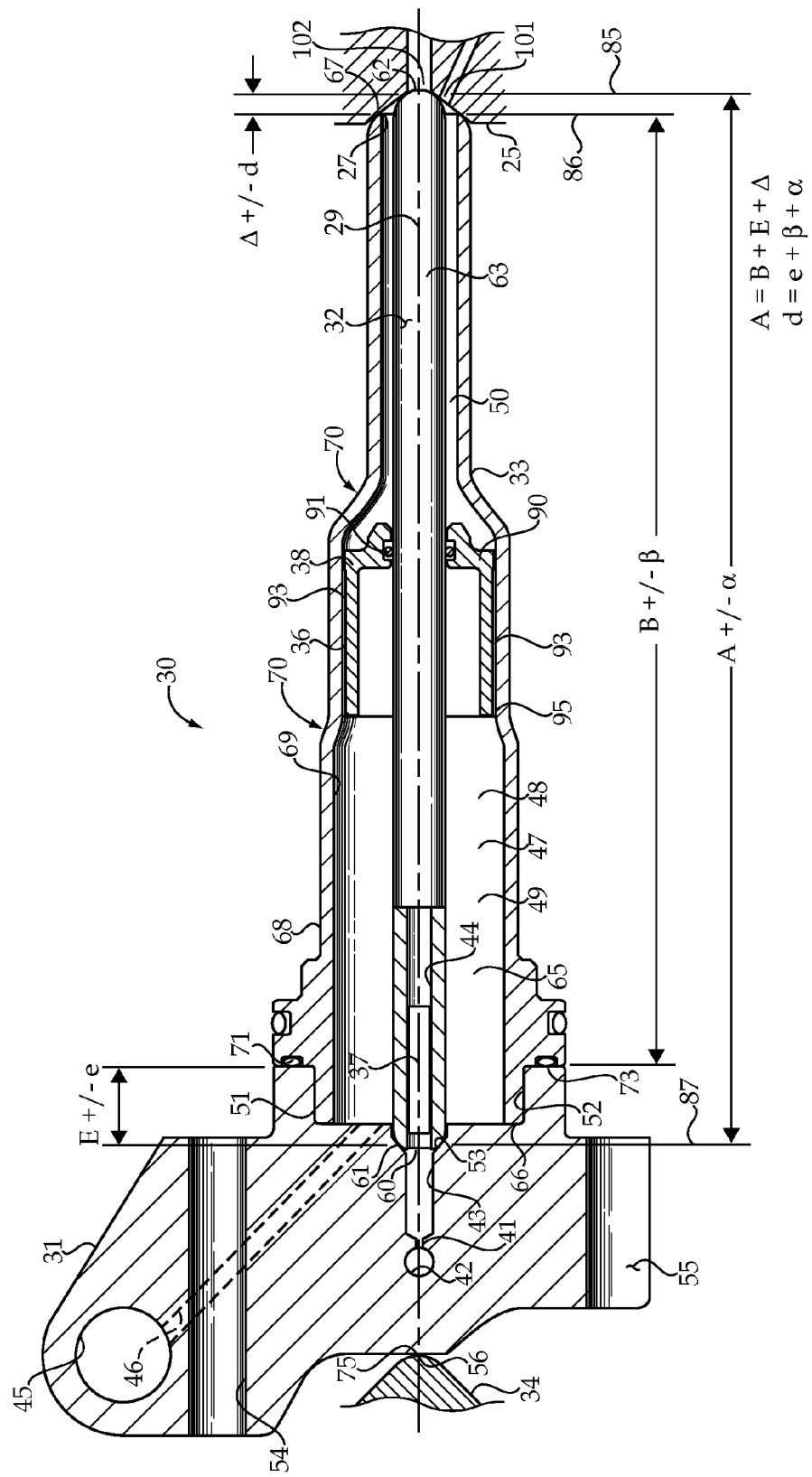
FIG. 4 is a sectioned side view through a co-axial quill assembly according to another aspect of the present disclosure.

Referring in addition to FIG. 4, the dual fuel common rail system 20 includes a co-axial quill assembly 30 with an inner quill 32 and an outer quill 33 in sealing contact with a common conical seat 27 of each fuel injector 25. In the illustrated embodiment, a pressure damping chamber 48 consists of an upstream segment 49 of the gaseous fuel conduit 47 that has a flow area at least several times larger than the downstream segment 50 of the gaseous fuel conduit 47. The pressure damping chamber 48 is defined in each co-axial quill assembly 30 in order to damp pressure waves moving from gaseous fuel common rail 21 toward the respective fuel injector 25, especially during an injection event. The pressure damping chamber 48 has a volume greater than a gaseous fuel volume 26 (nozzle chamber, sac and gas passageways) within the respective fuel injector 25. Those skilled in the art will appreciate that the available space constraints on fuel injector 25 limit the size of the gaseous fuel volume 26 within each fuel injector 25. The gas volume 26 in each fuel injector may likely be many times less than a rated gaseous injection volume from injector 25.

One strategy for sizing the pressure damping chamber 48 may start with the continuity equation, and then derive an equation for the pressure response of a particular fluid (e.g. natural gas) in a specific volume (the pressure damping chamber 48) to a flow rate arriving (from the rail 21) to a flow rate leaving the volume (injection rate). The idea is to reduce the pressure change reaction to the volume flow of the fluid to a satisfactory level. The pressure damping chamber 48 should provide sufficient absorbtion of arriving pressure waves to damp out reflective transients. Thus, one might consider a maximum rated volume of gaseous fuel delivery for fuel injector 25 in the engine 10, and the gas injection pressure, and size a volume of the pressure damping chamber 48 that will provide sufficient absorbtion of the pressure waves.

Referring again to FIGS. 2-4, each co-axial quill assembly 30 may include a load adjusting clamp 34 with a pivot surface 75 in contact with a block 31 at a load adjustment location 56 that is intersected by the axis 29 of the inner quill 32. The load adjusting clamp 34 may define a fastener slot 77 and a fastener bore 76 that receive a first fastener 81 and a second fastener 80, respectively. The load adjustment clamp 34 pivots on load adjustment location 56 responsive to adjustments to the first and second fasteners 81, 80. Fastener 80 may include a spherical washer and bolt, while fastener 81 may be a shoulder bolt that is utilized to set an attitude of load adjustment clamp 34. For instance, the proper assembly may require connection of co-axial quill assembly 30 to engine housing 11 with first fastener 81. Bolt 80 can then be tightened to a pre-determined torque that assures proper seating seal contact between outer quill 33 and inner quill 32, independently but simultaneously, on common conical seat 27 of fuel injector 25. During this process, load adjustment clamp 34 will pivot through some limited small angle. The fasteners 80 and 81 are received in fastener bore 54 and fastener slot 55, respectively of blocks 31.

Each block 31 of each co-axial quill assembly 30 defines a gaseous rail passage 45 that is oriented perpendicular to the axis 29 of inner quill 32 and fluidly connected to a gaseous fuel passage 46 that opens at one end into a quill chamber 52 outside of conical seat 53. The gaseous rail passage 45 may extend completely through block 31 in order to facilitate the daisy chain connection structure shown in FIGS. 1 and 2.

Each block 31 also includes a liquid rail passage 42, which may extend all the way through, and that is oriented perpendicular to the axis 29 and fluidly connected to a liquid fuel passage 43 that opens on one end into quill chamber 52 through conical seat 53. A segment of liquid fuel passage 43 may have an orifice segment 41, as shown, to reduce a flow rate from the liquid fuel common rail 22 to help manage transients in the inner quill 32. The minimum area required for the orifice 41 may be computed by dividing the total injection quantity by the injection duration, and sizing the orifice to allow that delivery with a minimum pressure drop. Thus, the sizing of that flow area may relate to the performance characteristics of fuel injector 25. The inner quill 32 defines a liquid fuel conduit 44 extending between a first end 60 and a second end 62. First end 60 includes an annular spherical surface 61 that rests in contact at a gage line 87 with, but remains unattached to, the conical seat 53, and a gage line 85 on an annular spherical surface at second end 62 in contact with common conical seat 27 of fuel injector 25. The outer quill 33 has a hollow interior 65 separating a first end 66 from a second end 67. The first end 66 is received in the quill chamber 52, and the outer quill 33 may be attached to block 31 with mating threads 51.

Practical manufacturing limitations may forbid mass production of co-axial quill assemblies 30 in which either the inner quill 32 or the outer quill 33 are integrally formed with block 31, or each other. Thus, an annular seal 71 serves to seal against leakage of gaseous fuel from between block 31 and outer quill 33 of co-axial quill assembly 30. In this embodiment, annular seal 71 includes an o-ring 73 in a face seal configuration trapped between block 31 and outer quill 33. In the illustrated construction, the inner quill 32 is out of contact with the outer quill 33 in each co-axial quill assembly 30. A gaseous fuel conduit 47 is fluidly connected to gaseous fuel passage 46, and also extends between outer surface 63 of inner quill 32 and the inner surface 69 of outer quill 33. Spatial constraints in engine housing 11 may require that an upstream half 49 of the gaseous fuel conduit 47 have a pressure damping chamber 48 with a volume larger than a volume of a downstream half 50 of the gaseous fuel conduit 47. Thus, a majority of the volume of the pressure damping chamber 48 may be located in an upstream half 49 of the gaseous fuel conduit 47 both within outer quill 33 and within quill chamber 52. As stated earlier, the pressure damping chamber 48 should be of sufficient size and shape to damp pressure waves arriving from the gaseous fuel passage 46 in order to reduce variations in gaseous fuel injection rates and quantities. In this specific example, the available space in engine housing 11 may permit the relatively uniform wall thickness of the outer quill 33, which is defined between an inner surface 69 and outer surface 68, to include two step wise diameter reductions 70 along the axis 29 in a direction of second end 67. Nevertheless, other engine housing geometries may vary substantially from that shown. The gaseous rail passage 45 of each block 31 may define a portion of the gaseous fuel common rail 22. Likewise, the liquid rail passage 42 of each block 31 may define a segment of the liquid fuel common rail 21 as best shown in FIGS. 1 and 2.

Referring more specifically to FIG. 4, reliable sealing contact between the co-axial quill assembly 30 and fuel injector 25 against leakage of both gaseous and liquid fuels may be accomplished by tightening only a single fastener 80 to a predetermined torque load. This may be accomplished by locating the gage line 85 at the second end 62 of the inner quill 32 to extend a predetermined target distance Δ beyond the gage line 86 at the second end 67 of the outer quill 33. The gage line 85, 86 is the sealing contact line. A predetermined load may be placed on block 31 by load adjusting clamp 34 acting along axis 29 so that the outer and inner quills 33, 32 seat and sealingly engage on common conical seat 27 at their respective gage lines 85, 86. Tightly controlling the predetermined target distance Δ may be accomplished in a number of ways. In the illustrated embodiment, target distance Δ is held to a tolerance d that is a stack up of tolerance e, β and α. Dimension distance E+/−tolerance e corresponds to the distance between the gage line of conical seat 53 and the shoulder face against which o-ring 73 seals on block 31. Dimension distance B+/−tolerance β corresponds to the distance from the shoulder surface of outer quill 33 to the gage line 86 at second end 67 of outer quill 33. Dimension distance A+/−tolerance α corresponds to the distance between the gage lines 87, 85 at opposite ends of inner quill 32. Provided that the distances A, B and E can be held within reasonable tolerances, the tolerance stack up d on target distance Δ can be made acceptable such that proper sealing at conical seat 27 of fuel injector 25 is reliably made. Tolerance stack up d equals e plus β and α. During preassembly, the predetermined target distance Δ may be set within an acceptable tolerance d by selecting a block 31 with an appropriate dimension distance E+/−e, an outer quill 33 with an appropriate dimension distance B+/−β, and a inner quill 32 with an appropriate dimension distance A+/−α. Provided that the tolerance stack up of e+B+A yields an acceptable tolerance d. A simple nearly fool proof installation may be assured by simply tightening a single fastener 80 to an appropriate torque load to apply an appropriate load along centerline 29.

Those skilled in the art will appreciate that the inner and outer quills 32, 33 may have different spring rates and may require different load levels to ensure proper sealing at common conical seat 27. Therefore, some differential length, which may be positive, negative or zero, depending upon the specific design, quill materials and geometries may need to be added to the above described dimensions in order to ensure proper sealing contact at fuel injectors 25.

In order to trap debris often liberated into the fuel flows during the first time operation of engine 10 after being built, co-axial quill assembly 30 may include a gaseous fuel edge filter 36 and a liquid fuel edge filter 37. In the illustrated embodiment, liquid fuel edge filter 37 may be positioned in the liquid fuel conduit 44 defined by inner quill 32. The gaseous fuel edge filter 36 is shown positioned within outer quill 33 between the two step wise diameter reductions 70. In the illustrated embodiment, gaseous fuel edge filer 36 may have a combined dual purpose by including a retainer 38 that can be thought of as in contact with the inner surface 69 of outer quill 33 and of the outer surface 63 of inner quill 32. In this embodiment, retainer 38 may include an o-ring 91 that encourages gaseous fuel traveling along gaseous fuel conduit 47 to move through filter passages 93 between edge filter 36 and outer quill 33 to trap debris upstream from fuel injector 25. Filter passages 93 may be distributed around, and oriented perpendicular to the axis 29. In this embodiment, retainer 38 may comprise a suitable metallic piece, such as aluminum, that is machined to the shape as shown and also includes an o-ring 91 that grips the outer surface 63 of inner quill 32. Retainer 38 may be connected to the outer quill 33 with a metal to metal interference fit 95.

Because inner quill 32 is unattached to either outer quill 33 or block 31, co-axial quill assembly 30 may include the retainer 38 that is in contact with the outer surface 63 to maintain the inner quill 32 with the block 31 and outer quill 33 during pre-installation handling. In other words, retainer 38 may inhibit inner quill 32 from falling out of outer quill 33 during pre-installation handling. The edge filter 36/retainer 38 of the disclosure allows the co-axial quill assemblies 30 to be preassembled with a precisely predetermined target distance Δ so that installation is made easy and simple without the need for custom adjustments at each co-axial quill assembly 30. In the illustrated embodiment, consistent leak free installation may only require torqueing fastener 80 to a predetermined load, without any other considerations.

In some versions of the present disclosure, the inner quill 32 and the outer quill 33 of each co-axial quill assembly 30 are a matched pair such that a gage line 85 at an end 62 of inner quill 32 extends a pre-determined target distance Δ beyond a gage line 86 at the end 67 of outer quill 33. This ensures that the inner and outer quills 32, 33 seat on common conical seat 27 responsive to a pre-determined load on co-axial quill assembly 30 along axis 29. Thus, each co-axial quill assembly may be interchangeable with any other co-axial quill assembly in engine 10. However, one could expect that at least one outer quill 33 of one co-axial quill assembly 30 will not match the inner quill 32 of an other co-axial quill assembly 30 in engine 10. Thus, the co-axial quill assemblies are best pre-assembled prior to installation of the fuel system 20 into engine 10. The preassembled co-axial quill assemblies 30 are retained together during pre-installation handling by a retainer 38. The retainer 38 should resist the separation of the inner quill 32 from its matched outer quill 33 absent a forced disassembly during pre-installation handling. However, the retainer 38 may permit some relative movement along axis 29 between outer quill 33 and inner quill 32 such as what might occur during installation of fuel system 20 to engine 10. After installation, the retainers 38 are left in place and may be inert to operation of the fuel system 11. Forced disassembly means that the matched quill pair 32, 33, will not accidently separate, such as by being dropped or may be even mishandled. The forced disassembly requires an intent and may be a tool(s) to separate one of the inner quill 32 and outer quill 33 from retainer 38. Being inert to operation of fuel system 20 means that fuel flows through or past retainer 38 without interfering with the flow to fuel injectors 25, even though the retainer may include an edge filter 36 for capturing liberated debris from fuel flow.

Figure 5:
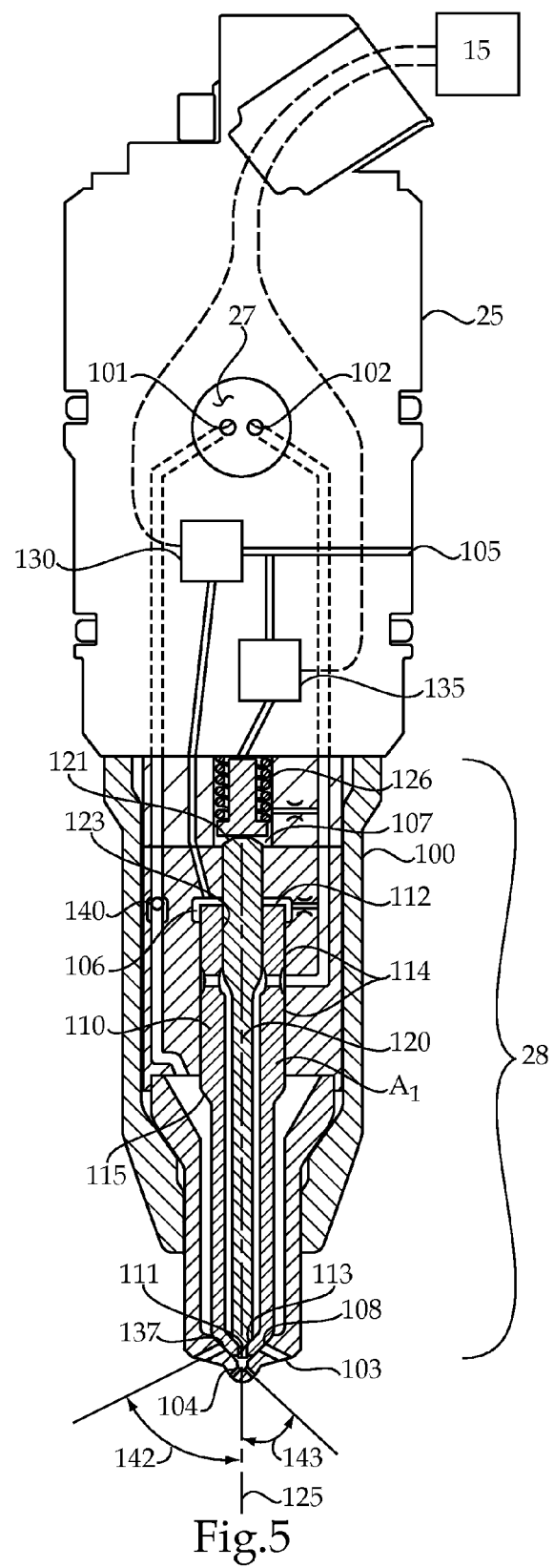
FIG. 5 is a front sectioned schematic view of a fuel injector according to the present disclosure.

Referring now to FIG. 5, an example fuel injector 25 includes a nozzle assembly 28 according to the present disclosure. Fuel injector 25 includes an injector body that defines a first fuel inlet 101, which may be connected to gaseous fuel common rail 21, and a second fuel inlet 102, which may be fluidly connected to the liquid fuel common rail 22. Injector body 100 also defines a first nozzle outlet set 103, a second nozzle outlet set 104 and a drain outlet 105. Although not shown, drain outlet 105 may be fluidly connected to the liquid fuel tank for recirculation. Although not necessary, liquid fuel is used as an injection medium, a control fluid a coolant and a lubricant in the example fuel system 20 according to the present disclosure. Fuel injector 25 includes a first check valve member 110 that defines a through passage 111 and is positioned entirely inside of injector body 100 with a closing hydraulic surface 112 exposed to fluid pressure in a first control chamber 106. A second check valve member 120 is also positioned entirely inside of injector body 100 with a closing hydraulic surface 121 exposed to fluid pressure in a second control chamber 107. Both the first control chamber 106 and the second control chamber 107 may be disposed within injector body 100. Pressure in first control chamber 106 may be controlled by a first control valve 130 that is attached to the injector body 100, while pressure in the second control chamber 107 may be controlled by a second control valve 135 that is also attached to injector body 100.

Those skilled in the art will appreciate that first control valve 130 and second control valve 135 could take a wide variety of forms including two-way valves, three-way valves, valves that share a common actuator and many other structures without departing from the present disclosure. However, in all cases, the first control valve 130 will have a first configuration at which the first control chamber 106 is fluidly blocked to the drain outlet 105, and a second configuration at which the first control chamber is fluidly connected to the drain outlet 105. Likewise, the second control valve 135 will have a first configuration at which the second control chamber 107 is fluidly blocked to the drain outlet 105, and a second configuration at which the second control chamber 107 is fluidly connected to the drain outlet 105. In the illustrated embodiment, both the first control chamber 106 and second control chamber 107 are filled with liquid fuel which acts as the control medium for controlling the operation of fuel injector 25.

The first check valve member 110 is movable between a closed position, as shown, in contact with a first seat 108 on injector body 100 covering the inlets 137 to first nozzle outlet set 103 to fluidly block the first fuel inlet 101 to the first nozzle outlet set 103, and an open position out of contact with the first seat 108 to fluidly connect the first fuel inlet 101 to the first nozzle outlet set 103 and the second nozzle outlet set 104 to facilitate a gaseous fuel injection event. In general, the first check valve member 110 will move toward or stay in its closed position when fluid pressure in first control chamber 106 is high, but move toward an upward open position when fluid pressure in first control chamber 106 is low. The second check valve member 120 is movable between a closed position, as shown, in contact with a second seat 113 on the first check valve member 110 to fluidly block the second fuel inlet 102 to the through passage 111 and the second nozzle outlet set 104, and an open position out of contact with the second seat 113 to fluidly connect the second fuel inlet 102 to the through passage 111 and the second nozzle outlet set 104 to facilitate a liquid fuel injection event. In general, second needle valve member 120 will stay at or move toward its closed position in contact with second seat 113 when pressure in second control chamber 107 is high, but move toward an open position when pressure in second control chamber 107 is low. Although possible, in most instances fuel injector 25 will be operated to inject gaseous fuel or liquid fuel, but rarely inject both fuels simultaneously.

In the illustrated embodiment, each of the first nozzle outlet set 103 and the second outlet set 104 include a plurality, such as six, nozzle outlets that are equally distributed angularly around a centerline 125 in a manner well known in the art. Nevertheless, each of the nozzle outlet sets 103 and 104 could have as few as one nozzle outlet and more than six nozzle outlets without departing from the present disclosure. The first seat 108 on injector body 100 may be on a conical surface that nearly matches a conical shape of first check valve member 110 so that first seat 108 is located between the first fuel inlet 101 and an inlet opening 137 of each nozzle passage of the first nozzle outlet set 103 a long centerline 125. Thus, first check valve member 110 may be configured to cover the first nozzle outlet set when in its closed position, as shown, but the sealing seating actually occurs just above the nozzle outlets 103 at first seat 108. The first nozzle outlet set 103 has a first total flow area. The second nozzle outlet set 104 has a second total flow area that may be less than the first total flow area. However, equal flow areas would also fall within the scope of the present disclosure. In addition, individual nozzle outlets in each set 103 and 104 may have different flow areas from each other or may be the same and the number of outlets in each set be different without departing from the present disclosure. In addition, the first nozzle outlet set may define a first spray angle 142 with respect to centerline 125. The second nozzle outlet set 104 may define a second spray angle 143 that is different from the first spray angle 142. In the illustrated embodiment, all of the individual nozzle outlets in first nozzle outlet set 103 have an identical first spray angle 142, but the individual nozzle outlets could have different spray angles such that the spray angle 142 represented an average spray angle for the first nozzle outlet set 103. Likewise, in the illustrated embodiment, the individual nozzle outlets in the second nozzle outlet set 104 each have an identical second spray angle 143; however, the individual nozzle outlets in set 104 could be different such that second spray angle 143 represented an average spray angle for the second nozzle outlet set 104. For instance, second nozzle outlet set 104 could be a so called shower head nozzle outlet set of the type associated with mixed mode fuel injectors of the type identified in the Background section of this disclosure.

In the illustrated fuel injector 25, liquid fuel acts not only as the injection medium, as a control fluid, but also serves to lubricate the movement of first check valve member 110 and second check valve member 120. The first check valve member 110 may have a guide interaction 114 with injector body 100, with liquid fuel serving to lubricate that guide interaction. Likewise, because one might expect to set the liquid fuel pressure higher than the gaseous fuel pressure, some liquid fuel might migrate along guide interaction 114 to eventually also lubricate the seating interaction that occurs between first check valve member 110 and injector body 100 at first seat 108. Thus, one might expect each gaseous fuel injection event to include a small quantity of liquid fuel that is ejected in each of event after serving its lubricating purpose. The second check valve member may have a guide interaction 123 with the first check valve member 110, and this guide interaction may also be lubricated with liquid fuel. Although not necessary, second check valve member 120 may also have a guide interaction with injector body 100 in the bore between first control chamber 106 and second control chamber 107.

In one specific example embodiment when first and second control valves 130 and 135 are simple two-way valves and the control function is accomplished through known A and Z orifices, one could expect the first control chamber 106 to be fluidly connected to the liquid fuel inlet 102 when the first control valve 130 is in both the first configuration and the second configurations described earlier. Likewise, the second control chamber 107 might be fluidly connected to the liquid fuel inlet 102 when the second control valve 135 is in at least one of its first configuration and second configuration described earlier.

The first check valve member 110 has an opening surface 115 with a first effective area that is exposed to gas fluid pressure in the gaseous fuel inlet 101 when the first check valve member 110 is at its closed position, as shown. The closing hydraulic surface 121 of the second check valve member 120 may have a second effective area that is less than the first effective area of opening surface 115 so that both first check valve member 110 and second check valve member 120 can be lifted to facilitate a gaseous fuel injection event even when pressure in second control chamber 107 remains high. Although not necessary, fuel injector 25 includes exactly one spring 126 that is operably positioned to bias the first check valve member 110 and the second check valve member 120 toward their respective closed positions. Nevertheless, the various opening surface areas and closing hydraulic surface areas could be adjusted by different pressures of the respective fluids and/or by including more than one biasing spring. Thus, different effective areas and different numbers of springs may be used to control or bias the motion of first and second check valve members 110, 120 without departing from the scope of the present disclosure. Because of the particular structure of nozzle assembly 28, both the first nozzle outlet set 103 and the second nozzle outlet set 104 will be connected to the gaseous fuel inlet 101 when the first check valve member 110 is lifted to its open position to facilitate a gaseous fuel injection event. However, because first check valve member 110 covers the first nozzle outlet set 103 when in its closed position, liquid fuel injection events occur only through second nozzle outlet set 104 in the illustrated embodiment.

In the illustrated fuel system 20, fuel injectors 25 are configured to inject both gaseous and liquid fuels. During normal operation, the majority of the fuel injected from fuel injectors 25 will be gaseous fuel, and only a small injection of liquid fuel is used to ignite the much larger gaseous fuel charge. However, there may be instances when the gaseous fuel is exhausted, shut off or maybe malfunctioning requiring that the engine 10 be operated on liquid fuel only. In the case that engine 10 is included as a portion of a mobile machine, such as a mining truck, this mode of operation might be referred to as a limp home mode. When in the limp home mode, no gaseous fuel is injected and relatively larger amounts of liquid fuel are instead injected to compression ignite and power engine 10 in a known manner. However, in order to prevent liquid fuel from migrating into the gaseous fuel lines and possibly back out of fuel injectors 25 toward the gaseous fuel common rail 21, fuel injectors 25 may include a limp home check valve 140 that acts to prevent liquid fuel migration in the event of prolonged operation in a limp home mode. Limp home check valve 140 may be fluidly positioned between gaseous fuel inlet 101 and the first nozzle outlet set 103.

INDUSTRIAL APPLICABILITY

The present disclosure could apply to any fuel injector with dual checks to provide additional capabilities to a fuel system, including but limited to different spray angles, different flow areas, different fuels, and maybe even the same fuel at different pressures. Although the fuel injector 25 is illustrated as a dual fuel common rail fuel injector, the nozzle portion of the fuel injector could be potentially associated with other fuel injector types, including but not limited to cam actuated fuel injectors or even hybrid common rail and cam actuated fuel systems of a type known in the art without departing from the present disclosure. The present disclosure also applies broadly to any engine that utilizes two fluidly distinct common rails to deliver fuel to a single fuel injector associated with each engine cylinder. The contents of the respective common rails may differ in at least one of pressure, chemical identity and matter phase without departing from the present disclosure. In the illustrated example, the respective common rails may differ in all three by containing pressurized natural gas and liquid diesel fuel, respectively at different pressures.

Referring back to all of the FIGS. 1-5, a method of operating dual fuel engine 10 begins by assembling a dual fuel common rail system 20 to an engine housing 11. Gaseous fuel is supplied from the gaseous fuel common rail 22 to each of the plurality of fuel injectors 25 from a respective co-axial quill assembly 30. Likewise, liquid fuel from a liquid fuel common rail 21 is supplied to each of the plurality of fuel injectors 25 by the same respective co-axial quill assemblies 30. When in operation, gaseous fuel is injected from each fuel injector 25 into an engine cylinder 12 responsive to a gaseous fuel injection signal communicated from electronic engine controller 15 to first control valve 130 of the fuel injector 25 to relieve pressure in first control chamber 106. Also, liquid fuel from the fuel injector 25 is injected directly into engine cylinder 12 from the same fuel injector 25 responsive to a liquid fuel injection signal from electronic engine controller 15 to second control valve 135 to relieve pressure in second control chamber 107. Both control chambers 106 and 107 are preferably filled with liquid fuel, which acts as the control fluid for both liquid and gaseous fuel injection events. In a typical scenario, the gaseous fuel is ignited by compression igniting the liquid fuel. However, fuel system 20 can also operate on liquid fuel only, in a so called limp home mode if the gaseous fuel supply is exhausted or otherwise turned off.

Variations in gas fuel injection quantities among the plurality of fuel injectors 25 are reduced by damping pressure waves arriving from the gaseous fuel common rail 22 with a pressure damping chamber 48 defined by each respective co-axial quill assembly 30. During gaseous fuel injections, gaseous fuel arrives in quill chamber 52 from gaseous fuel passage 46. The gaseous fuel then flows in grooves of edge filter 36 with debris being trapped between the outer surface of edge filter 36 and the inner surface 69 of outer quill 33. This flow pattern may be encouraged by having mating geometry that encourages the sealing contact between retainer 38 and the various other components including inner quill 32, edge filter 36 and block 31. During the pre-assembly of each co-axial quill assembly 30, the predetermined target distance Δ is set as discussed earlier.

During installation, the inner quill 32 may be clamped between the conical seat 53 of block 31 and the common conical seat 27 of the respective fuel injector 25. By utilizing blocks 31 for each co-axial quill assembly and by orienting them appropriately as described, dual fuel common rail system 20 facilitates construction of gaseous fuel common rail 22 and the liquid fuel common rail 21 by daisy chaining a plurality of co-axial quill assemblies 30 together utilizing identical gaseous fuel line segments 18, liquid fuel line segments 19 and associated fittings received in respective gaseous rail passages 45 and liquid rail passages 42. Both the pre-installation construction and the installation configuration shown serve to maintain the inner quill 32 of each co-axial quill assembly 30 out of contact with the respective outer quill 33.

The present disclosure addresses a previously unrecognized problem associated with undesirable, and maybe unpredictable, variations in gaseous fuel injection rates and quantities due to pressure fluctuations within the fuel injector 25 during gaseous fuel injection events. The present disclosure insightfully recognizes that a small flow area orifice in the liquid fuel supply inhibits the pressure fluctuations in the associated liquid fuel injection variations, whereas an enlarged volume pressure damping chamber 48 serves a similar purpose in reducing pressure fluctuations during gaseous fuel injection events within the respective fuel injectors 25.

Prior to assembling the fuel system 20, a plurality of quill assemblies 30 are preassembled to include a block 31, and inner quill 32 and an outer quill 33. During preassembly, dimensions are checked in order to match an inner quill 32 with an outer quill 33 of each quill assembly 30 such that the gage line 85 at an end of inner quill 32 extends a predetermined target distance Δ beyond a gage line 86 at the end of outer quill 33. This ensures that the inner and outer quills 32, 33 will seat and seal on the common conical seat 27 responsive to a predetermined load on co-axial quill assembly 30 along axis 29. After being matched, the inner and outer quills 32, 33 may be retained together during pre-installation handling with a retainer 38 positioned between the inner and outer quills 32, 33. Although not a necessity, the retainer 38 may also serve to keep the inner quill 32 and the outer quill 33 out of contact with one another. After the fuel system 20 is installed, the retainers 38 are left in place but are preferably inert to the operation of engine 10.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A fuel injector comprising:
   an injector body defining a first fuel type inlet, a second fuel type inlet, a first nozzle outlet set, a second nozzle outlet set and a drain outlet, and having disposed therein a first control chamber and a second control chamber;
   a first check valve member defining a through passage and being positioned entirely inside the injector body with a closing hydraulic surface exposed to a fluid pressure in the first control chamber, and being movable between a closed position in contact with a first seat on the injector body covering the first nozzle outlet set to fluidly block the first fuel type inlet to the first nozzle outlet set, and an open position out of contact with the first seat to fluidly connect the first fuel type inlet to the first nozzle outlet set, wherein the fluid pressure present at the closing hydraulic surface in the first control chamber acts to keep or move the first check valve member in the closed position, the fluid pressure at the closing hydraulic surface when the first check valve member is in the closed position being higher than the fluid pressure for the open position of the first check valve member;
   a second check valve member positioned entirely inside the injector body with a closing hydraulic surface exposed to a fluid pressure in the second control chamber, and being movable between a closed position in contact with a second seat on the first check valve member to fluidly block the second fuel type inlet to the through passage and the second nozzle outlet set, and an open position out of contact with the second seat to fluidly connect the second fuel type inlet to the through passage and the second nozzle outlet set, wherein the fluid pressure present at the closing hydraulic surface in the second control chamber acts to keep or move the second check valve member in the closed position, the fluid pressure at the closing hydraulic surface when the second check valve member is in the closed position being higher than the fluid pressure for the open position of the second check valve member;
   a first control valve attached to the injector body and having a first configuration at which the first control chamber is fluidly blocked to the drain outlet, and a second configuration at which the first control chamber is fluidly connected to the drain outlet; and
   a second control valve attached to the injector body and having a first configuration at which the second control chamber is fluidly blocked to the drain outlet, and a second configuration at which the second control chamber is fluidly connected to the drain outlet.

2. The fuel injector of claim 1 wherein the injector body has a centerline;
   the first seat being located between the first fuel type inlet and an inlet opening of each nozzle passage of the first nozzle outlet set along the centerline.

3. The fuel injector of claim 1 including a limp home check valve fluidly positioned between the first fuel type inlet and the first nozzle outlet set.

4. The fuel injector of claim 1 wherein the first nozzle outlet set has a first total flow area;
   the second nozzle outlet set has a second total flow area that is less than the first total flow area.

5. The fuel injector of claim 1 wherein the injector body has a centerline;
   the first nozzle outlet set defines a first spray angle with respect to the centerline;
   the second nozzle outlet set defines a second spray angle that is different from the first spray angle.

6. The fuel injector of claim 1 wherein the first check valve member has a guide interaction with the injector body; and
   the second check valve member has a guide interaction with the first check valve member.

7. The fuel injector of claim 1 wherein the first control chamber is fluidly connected to the second fuel type inlet when the first control valve is in either the first configuration or the second configuration; and
   the second control chamber is fluidly connected to the second fuel type inlet when the second control valve is in either the first configuration or the second configuration.

8. The fuel injector of claim 1 wherein the first check valve member has an opening surface with a first effective area exposed to a fluid pressure in the first fuel type inlet when the first check valve member is at the closed position;
   the closing hydraulic surface of the second check valve member has a second effective area that is less than the first effective area.

9. The fuel injector of claim 1 including exactly one spring operably positioned to bias the first and second check valve members toward the respective closed positions.

10. The fuel injector of claim 1 wherein the first nozzle outlet set and the second nozzle outlet set are both fluidly connected to the first fuel type inlet when the first check valve member is at the open position.

11. A fuel system comprising:
    a plurality of fuel injectors that each comprise an injector body defining a first fuel inlet, a second fuel inlet, a first nozzle outlet set, a second nozzle outlet set and a drain outlet, and having disposed therein a first control chamber and a second control chamber;
    a first check valve member defining a through passage and being positioned entirely inside the injector body with a closing hydraulic surface exposed to a fluid pressure in the first control chamber, and being movable between a closed position in contact with a first seat on the injector body covering the first nozzle outlet set to fluidly block the first fuel inlet to the first nozzle outlet set and an open position out of contact with the first seat to fluidly connect the first fuel inlet to the first nozzle outlet set, wherein the fluid pressure present at the closing hydraulic surface in the first control chamber acts to keep or move the first check valve member in the closed position, the fluid pressure at the closing hydraulic surface when the first check valve member is in the closed position being higher than the fluid pressure for the open position of the first check valve member;
    a second check valve member positioned entirely inside the injector body with a closing hydraulic surface exposed to a fluid pressure in the second control chamber, and being movable between a closed position in contact with a second seat on the first check valve member to fluidly block the second fuel inlet to the through passage and the second nozzle outlet set, and an open position out of contact with the second seat to fluidly connect the second fuel inlet to the through passage and the second nozzle outlet set, wherein the fluid pressure present at the closing hydraulic surface in the second control chamber acts to keep or move the second check valve member in the closed position, the fluid pressure at the closing hydraulic surface when the second check valve member is in the closed position being higher than the fluid pressure for the open position of the second check valve member;

a source of first fuel fluidly connected to the first fuel inlet;
a source of second fuel fluidly connected to the second fuel inlet;
an electronic controller in control communication with each of the plurality of fuel injectors; and
the first fuel differing from the second fuel in at least one of chemical identity, matter phase and pressure.

12. The fuel system of claim 11 wherein the source of first fuel includes a first common rail; and
the source of second fuel includes a second common rail.

13. The fuel system of claim 12 wherein the first fuel is natural gas;
the second fuel is liquid diesel fuel;
the first common rail is at a first pressure; and
the second common rail is at a second pressure greater than the first pressure.

14. The fuel system of claim 13 wherein each of the plurality of fuel injectors includes a limp home check valve fluidly positioned between the first fuel inlet and the first nozzle outlet set.

15. The fuel system of claim 14 wherein each of the plurality of fuel injectors includes:
a first control valve attached to the injector body and having a first configuration at which the first control chamber is fluidly blocked to the drain outlet and a second configuration at which the first control chamber is fluidly connected to the drain outlet; and
a second control valve attached to the injector body and having a first configuration at which the second control chamber is fluidly blocked to the drain outlet, and a second configuration at which the second control chamber is fluidly connected to the drain outlet.

16. The fuel system of claim 15 wherein the first control chamber is fluidly connected to the second fuel inlet when the first control valve is in either the first configuration or the second configuration;
the second control chamber is fluidly connected to the second fuel inlet when the second control valve is in either the first configuration or the second configuration; and
wherein the first nozzle outlet set and the second nozzle outlet set are both fluidly connected to the first fuel inlet when the first check valve member is at the open position.

17. The fuel system of claim 16 wherein the first check valve member has an opening surface with a first effective area exposed to the fluid pressure in the first fuel inlet when the first check valve member is at the closed position;
the closing hydraulic surface of the second check valve member has a second effective area that is less than the first effective area; and
each of the plurality of fuel injectors including exactly one spring operably positioned to bias the first and second check valve members toward the respective closed positions.

18. A method of operating a fuel system with a plurality of fuel injectors that each comprise an injector body defining a first fuel inlet, a second fuel inlet, a first nozzle outlet set, a second nozzle outlet set and a drain outlet, and having disposed therein a first control chamber and a second control chamber; a first check valve member defining a through passage and being positioned entirely inside the injector body with a closing hydraulic surface exposed to a fluid pressure in the first control chamber, and being movable between a closed position in contact with a first seat on the injector body covering the first nozzle outlet set to fluidly block the first fuel inlet to the first nozzle outlet set, and an open position out of contact with the first seat to fluidly connect the first fuel inlet to the first nozzle outlet set; a second check valve member positioned entirely inside the injector body with a closing hydraulic surface exposed to a fluid pressure in the second control chamber, and being movable between a closed position in contact with a second seat on the first check valve member to fluidly block the second fuel inlet to the through passage and the second nozzle outlet set, and an open position out of contact with the second seat to fluidly connect the second fuel inlet to the through passage and the second nozzle outlet set; the method comprising the steps of:
supplying gaseous fuel from a first common rail to the first fuel inlet;
supplying liquid fuel from a second common rail to the second fuel inlet;
reducing the fluid pressure present at the closing hydraulic surface in the first control chamber to keep or move the first check valve member in the open position, the fluid pressure at the closing hydraulic surface when the first check valve member is in the closed position being higher than the fluid pressure for the open position of the first check valve member;
reducing the fluid pressure present at the closing hydraulic surface in the second control chamber to keep or move the second check valve member in the open position, the fluid pressure at the closing hydraulic surface when the second check valve member is in the closed position being higher than the fluid pressure for the open position of the second check valve member;
injecting gaseous fuel from one of the plurality of fuel injectors through the first nozzle outlet set and the second nozzle outlet set when the first check valve member and the second check valve member are respectively in the open position; and
injecting liquid fuel from the second nozzle outlet set when the second check valve member is in the open position.

19. The method of claim 18 wherein the gaseous fuel injection step includes relieving pressure in the first control chamber responsive to a gas injection signal to a first control valve from an electronic controller;
the liquid injection step includes relieving pressure in the second control chamber responsive to a liquid injection signal to a second control valve from the electronic controller.

20. The method of claim 19 including a step of filling the first control chamber and the second control chamber with the liquid fuel; and
igniting the gaseous fuel by compression igniting the liquid fuel.

* * * * *